US010625664B2

(12) United States Patent
Ohgitani et al.

(10) Patent No.: US 10,625,664 B2
(45) Date of Patent: Apr. 21, 2020

(54) VEHICLE LIGHTING DEVICE

(71) Applicants: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(72) Inventors: Ikkei Ohgitani, Kariya (JP); Muneaki Inagaki, Kariya (JP); Keiji Yoshifusa, Kariya (JP)

(73) Assignees: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/351,690

(22) Filed: Mar. 13, 2019

(65) Prior Publication Data

US 2019/0283663 A1    Sep. 19, 2019

(30) Foreign Application Priority Data

Mar. 16, 2018    (JP) .................................. 2018-050012

(51) Int. Cl.
    *B60Q 1/30*    (2006.01)
    *B60Q 1/04*    (2006.01)
    (Continued)

(52) U.S. Cl.
    CPC .................. *B60Q 1/30* (2013.01); *B60Q 1/04* (2013.01); *F21S 41/24* (2018.01); *F21S 41/30* (2018.01);
    (Continued)

(58) Field of Classification Search
    None
    See application file for complete search history.

(56) References Cited

U.S. PATENT DOCUMENTS

| 2014/0211449 A1* | 7/2014 | Nomura ................. B60Q 1/302 |
| | | 362/84 |
| 2015/0062943 A1* | 3/2015 | Takahira ............... F21S 41/675 |
| | | 362/510 |

(Continued)

FOREIGN PATENT DOCUMENTS

| JP | 2011-044396 A | 3/2011 |
| JP | 2012-028156 A | 2/2012 |

(Continued)

*Primary Examiner* — Ashok Patel
(74) *Attorney, Agent, or Firm* — Sughrue Mion, PLLC

(57) ABSTRACT

A vehicle lighting device configured to be mounted on a vehicle. The vehicle lighting device includes a bar-shaped light guide and a light emitter. The light guide includes a first body section and a second body section. The first body section includes a first end, a second end, which is opposite to the first end, a straight section, which extends from the first end, and a curved section, which extends from the straight section to the second end. The second body section branches off from the straight section and extends in a direction different from a direction in which the curved section extends. The light emitter is arranged to emit light toward the first end of the first body section. The curved section and the second body section are configured to emit light in different directions.

18 Claims, 3 Drawing Sheets

(51) Int. Cl.
    *F21S 43/237*     (2018.01)
    *F21S 41/24*     (2018.01)
    *F21S 41/30*     (2018.01)
    *F21S 43/30*     (2018.01)
    *F21Y 115/10*     (2016.01)

(52) U.S. Cl.
    CPC ............ *F21S 43/237* (2018.01); *F21S 43/30* (2018.01); *F21Y 2115/10* (2016.08)

(56) References Cited

U.S. PATENT DOCUMENTS

2017/0356615 A1* 12/2017 Min ................... F21S 43/14
2018/0210127 A1* 7/2018 Akiyama ............ G02B 6/001

FOREIGN PATENT DOCUMENTS

| JP | 2015-170387 A | 9/2015 |
| JP | 2016-119273 A | 6/2016 |

\* cited by examiner

VEHICLE LIGHTING DEVICE

BACKGROUND

The present disclosure relates to a vehicle lighting device.

Vehicles, such as automobiles, are equipped with vehicle lighting devices, such as headlamps and tail lamps. For example, the vehicle lighting device disclosed in Japanese Laid-Open Patent Publication No. 2012-28156 includes a light source and a light guide having a plurality of reflection surfaces that face in different directions. The light emitted from the light source to the light guide is reflected at the different reflection surfaces, so that the vehicle lighting device emits light in different directions.

The light guide of the above-described publication requires a larger light guide to illuminate a larger area. As such, the vehicle lighting device requires some techniques to be devised to increase its light intensity distribution performance.

SUMMARY

It is an objective of the present disclosure to provide a vehicle lighting device having an increased light intensity distribution performance.

In accordance with a first aspect of the present disclosure, a vehicle lighting device configured to be mounted on a rear section of a vehicle is provided. The vehicle lighting device includes a bar-shaped light guide and a light emitter. The bar-shaped light guide includes a first body section and a second body section. The first body section includes a first end, a second end, which is opposite to the first end, a straight section, which extends from the first end, and a curved section, which extends from the straight section to the second end. The second body section branches off from the straight section and extends in a direction different from a direction in which the curved section extends. The light emitter is arranged to emit light toward the first end of the first body section. The curved section is configured to guide light that enters the straight section to a rear side of the vehicle so as to function as a tail lamp of the vehicle. The second body section is configured to guide light that is reflected within the straight section to a side of the vehicle so as to function as a side-marker lamp of the vehicle.

In accordance with a second aspect of the present disclosure, a vehicle lighting device configured to be mounted on a front section of a vehicle is provided. The vehicle lighting device includes a bar-shaped light guide and a light emitter. The bar-shaped light guide includes a first body section and a second body section. The first body section includes a first end, a second end, which is opposite to the first end, a straight section, which extends from the first end, and a curved section, which extends from the straight section to the second end. The second body section branches off from the straight section and extends in a direction different from a direction in which the curved section extends. The light emitter is arranged to emit light toward the first end of the first body section. The curved section is configured to guide light that enters the straight section to a front side of the vehicle so as to function as a headlamp, a clearance lamp, a daytime running light, or a daytime running lamp. The second body section is configured to guide light that is reflected within the straight section to a side of the vehicle so as to function as a side-marker lamp.

In accordance with a third aspect of the present disclosure, a vehicle lighting device configured to be mounted on a vehicle is provided. The vehicle lighting device includes a bar-shaped light guide and a light emitter. The bar-shaped light guide includes a first body section and a second body section. The first body section includes a first end, a second end, which is opposite to the first end, a straight section, which extends from the first end, and a curved section, which extends from the straight section to the second end. The second body section branches off from the straight section and extends in a direction different from a direction in which the curved section extends. The light emitter is arranged to emit light toward the first end of the first body section. The curved section and the second body section are configured to emit light in different directions.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

Vehicle lighting devices 11 according to an embodiment will now be described with reference to FIGS. 1 to 3. In the following description, the front, rear, right, and left are defined with reference to the direction of a vehicle 10.

Figure 1:
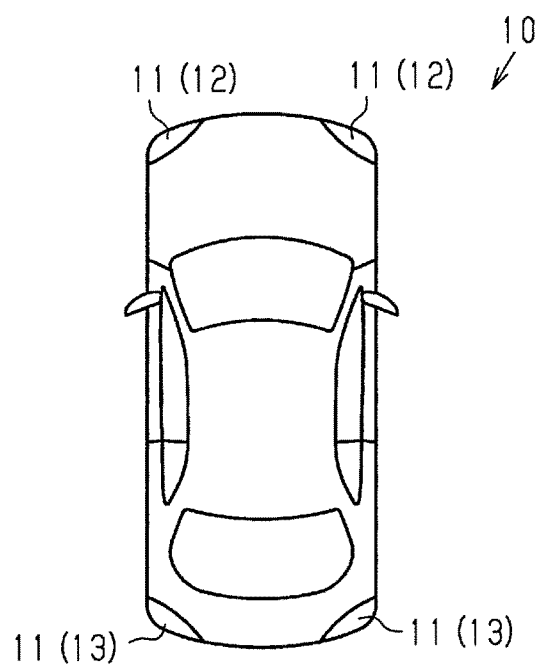
FIG. 1 is a plan view showing a vehicle having vehicle lighting devices of an embodiment.

As shown in FIG. 1, the vehicle 10 includes the vehicle lighting devices 11. The vehicle lighting devices 11 include two headlamps 12, which are mounted on the front section of the vehicle 10, and two tail lamps 13, which are mounted on the rear section of the vehicle 10. The two headlamps 12 are laterally symmetric and mounted on the left and right sides of the vehicle 10. The two headlamps 12 are identical in function. The two tail lamps 13 are laterally symmetric and mounted on the left and right sides of the vehicle 10. The two tail lamps 13 are identical in function.

In this embodiment, the right tail lamp 13 is described as an example of a vehicle lighting device 11.

Figure 2:
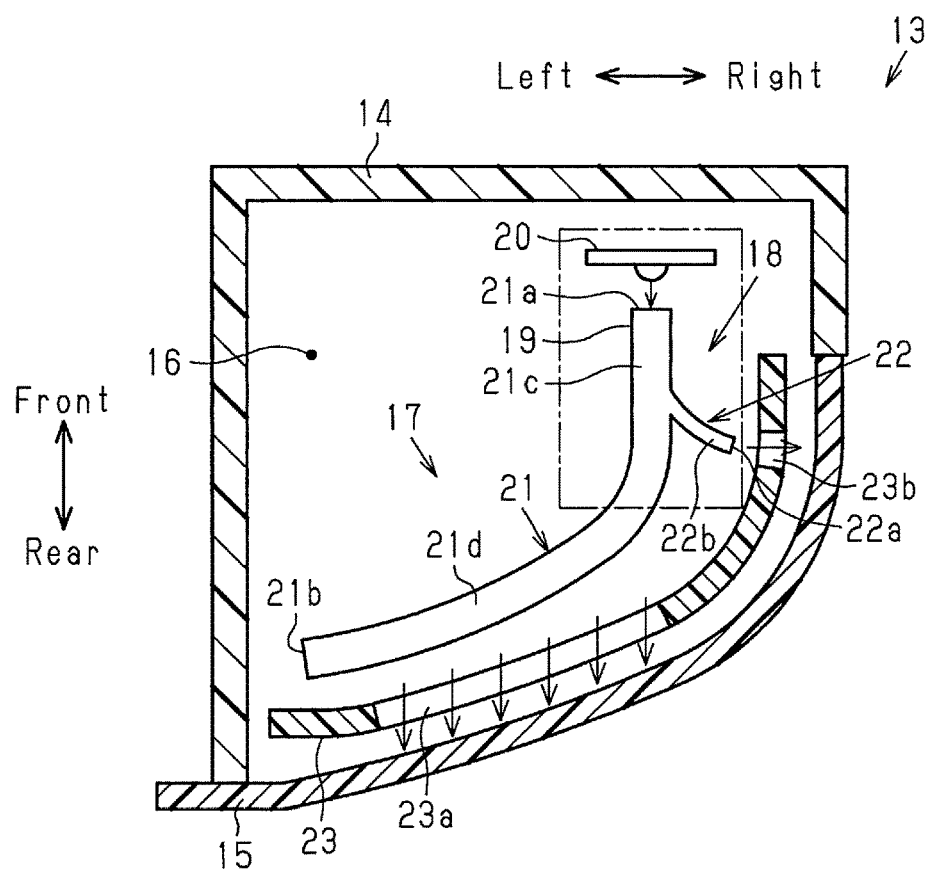
FIG. 2 is a cross-sectional view showing a tail lamp that is an example of the vehicle lighting devices in FIG. 1.

As shown in FIG. 2, the tail lamp 13 includes a housing 14, which opens to the right and to the rear (the light radiation directions), and an outer lens 15, which is a cover attached to the opening of the housing 14. The housing 14 and the outer lens 15 define a light chamber 16. The light chamber 16 houses a plurality of radiation sections with different functions. The plurality of radiation sections includes a first radiation section 17 and a second radiation section 18. The first radiation section 17 functions as a tail lamp for illuminating the rear side of the vehicle 10. The second radiation section 18 functions as a side-marker lamp for illuminating a side of the vehicle 10.

The light chamber 16 houses a bar-shaped light guide 19 and a light emitting unit 20, which serves as a light emitter. The light emitting unit 20 emits light toward the light guide 19. The light emitted by the light emitter is reflected within the light guide 19 and guided in predetermined directions. The light guide 19 is made of a plastic, such as an acrylic plastic. The light guide 19 may be a round bar having a circular cross-section. The light emitting unit 20 includes a substrate on which an LED is mounted. The substrate of one light emitting unit may have a single LED or a plurality of LEDs. The vehicle lighting device 11 includes a single light emitting unit, that is, a single light source.

The light guide 19 includes a first body section 21 and a second body section 22, which branches off from a middle part of the first body section 21. The first and second body sections 21 and 22 are formed integrally. The first and second body sections 21 and 22 are each shaped as a bar having a circular cross-section.

The first body section 21 includes a first end 21a, a second end 21b, which is opposite to the first end 21a, a straight section 21c, which extends linearly from the first end 21a, and a curved section 21d, which curves and extends from the straight section 21c to the second end 21b. The entire straight section 21c has a uniform diameter and a uniform cross-sectional shape. The entire curved section 21d has a uniform diameter and a uniform cross-sectional shape. The straight section 21c and the curved section 21d are identical in diameter and cross-sectional shape. The second end 21b of the first body section 21 points inward in the vehicle width direction.

The second body section 22 includes a basal end, which connects to the straight section 21c of the first body section 21, a distal end 22a, which is opposite to the basal end, and a branch section 22b, which curves and extends from the basal end to the distal end 22a. The entire second body section 22 (the branch section 22b) has a uniform diameter and a uniform cross-sectional shape. As with the straight section 21c and the curved section 21d of the first body section 21, the branch section 22b has a circular cross-section. The second body section 22 has a smaller diameter than the first body section 21. That is, in the present embodiment, the first body section 21 is thicker than the second body section 22, and the second body section 22 is thinner than the first body section 21. Further, in the present embodiment, the entire first body section 21 or the curved section 21d curves more gently than the second body section 22. In other words, the entire second body section 22 curves steeper than the first body section 21. The variations in shape of the light guide 19 allow the vehicle lighting device 11 to provide various luminous intensities and brightnesses. For example, a straight section of the light guide 19 provides a higher luminous intensity or brightness than a steeper curved section.

The straight section 21c of the first body section 21 extends in the front-rear direction of the vehicle 10 and is located outward of the curved section 21d in the vehicle width direction in the light chamber 16. The curved section 21d of the first body section 21 extends in the vehicle width direction. In the light chamber 16, the second end 21b is located inward of the first end 21a in the vehicle width direction. The curved section 21d curves along the outer lens 15 in the light chamber 16. The second body section 22 (the branch section 22b) extends in the vehicle width direction and is located outward of the straight section 21c and the curved section 21d in the vehicle width direction in the light chamber 16. The second body section 22 curves such that the distal end 22a points to the right (outward in the vehicle width direction, or the direction away from the second end 21b of the first body section 21) in the light chamber 16.

In the light chamber 16, the light emitting section of the light emitting unit 20 faces the first end 21a of the first body section 21. This allows the light emitted by the light emitting unit 20 to enter the light guide 19 through the first end 21a. In the light chamber 16, a partition wall 23 is arranged between the light guide 19 and the outer lens 15. The partition wall 23 extends along the light guide 19 and the outer lens 15. The partition wall 23 includes a first passage 23a and a second passage 23b. The first passage 23a is a through-hole that allows the light guided to the curved section 21d of the first body section 21 to travel through the outer lens 15. The second passage 23b is a through-hole that allows the light guided to the distal end 22a of the second body section 22 to travel through the outer lens 15. These two through-holes (the passages 23a and 23b) open in different directions in which light should be emitted. Specifically, the first passage 23a opens to the rear, and the second passage 23b opens to the right. The first passage 23a has a larger opening area than the second passage 23b. The first passage 23a is located behind the part of the curved section 21d that is less curved than the other part, that is, the part extending in the vehicle width direction. The second passage 23b is located at the right side of the distal end 22a of the second body section 22.

The operation of the tail lamp 13, which is a vehicle lighting device 11 of the present embodiment, is now described.

Figure 3:
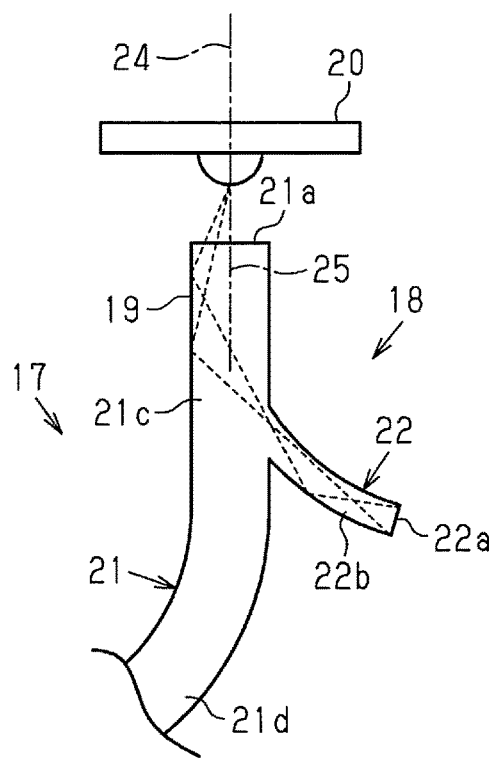
FIG. 3 is an enlarged view showing the area defined by the long dashed short dashed line in FIG. 2.

As shown in FIG. 3, the light emitting unit 20 has an optical axis 24, which coincides with the axis 25 of the straight section 21c. The light entering through the first end 21a from the light emitting unit 20 is reflected within the straight section 21c and guided to the curved section 21d. The light guided to the curved section 21d then passes through the first passage 23a of the partition wall 23 and reaches the outer lens 15. After passing through the outer lens 15, the light is emitted to the rear of the vehicle 10. The light passing through the outer lens 15 illuminates the rear of the vehicle 10. The curved section 21d (and the first passage 23a) thus functions as the first radiation section 17, in other words, as a tail lamp.

As indicated by the broken lines in FIG. 3, some of the light reflected in the straight section 21c is guided into the second body section 22. The light that enters the branch section 22b through the straight section 21c is reflected within the branch section 22b and reaches the distal end 22a. The light guided to the distal end 22a then passes through the second passage 23b of the partition wall 23 and reaches the outer lens 15. After passing through the outer lens 15, the light is emitted to a side of the vehicle 10. The light passing through the outer lens 15 illuminates the side of the vehicle 10. The second body section 22 (and the second passage 23b) thus functions as the second radiation section 18, in other words, as a side-marker lamp.

The present embodiment has the following advantages.

(1) The light guide 19, which includes the first body section 21 and the second body section 22 branching off from the first body section 21, guides the light emitted by the single light emitting unit 20 into two directions. That is, in addition to functioning as a tail lamp for emitting light to the rear, the tail lamp 13 also functions as a side-marker lamp for emitting light to the side. The bar-shaped light guide 19 is capable of guiding light to a wide area, increasing the light intensity distribution performance.

(2) The tail lamp 13 includes the single light emitting unit 20 and therefore consumes less power and requires fewer components than a structure that includes a separate light emitting unit 20 for each of the light radiation directions.

(3) The straight section 21c and the curved section 21d of the first body section 21 are larger than the branch section 22b of the second body section 22 in cross-sectional area. The first body section 21 therefore guides a greater amount of light than the second body section 22. The luminous intensity or brightness may be adjusted according to the radiation direction.

(4) The first body section 21, in particular, the part of the curved section 21d that extends in the vehicle width direction, curves more gently than the second body section 22. As such, the light that enters the first body section 21 through the first end 21a readily reaches the curved section 21d, so that a greater amount of light is guided to the first body section 21 than to the second body section 22. The luminous intensity or brightness of each of the first radiation section 17 and the second radiation section 18 is thus adjusted.

(5) The second body section 22 (the second radiation section 18), which emits light from the distal end 22a, functions as a side-marker lamp. This limits spreading of the light of the side-marker lamp, allowing the light to be localized. As a result, the light illuminating the side is distinguished from the light emitted through the first body section 21, and the functions of the two lamps are thus differentiated from each other.

The embodiment may be modified as follows. The embodiment and the following modifications can be combined as long as the combined modifications remain technically consistent with each other.

Figure 4:
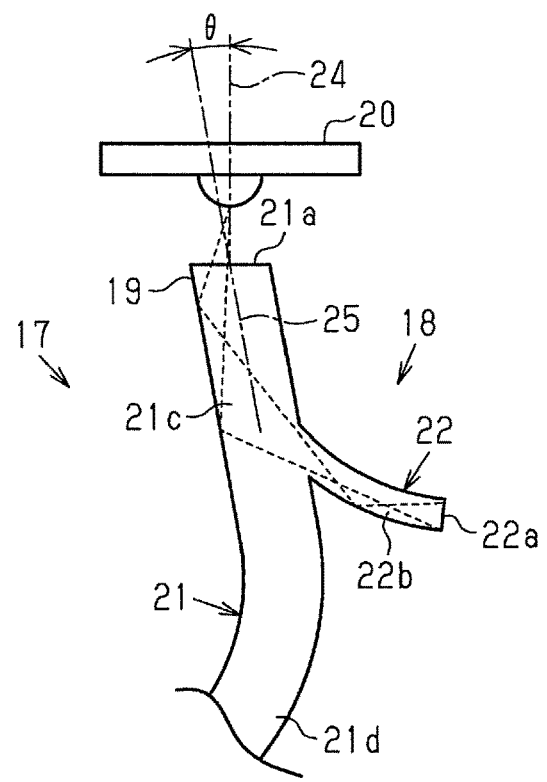
FIG. 4 is a diagram illustrating a modification of a tail lamp.

As shown in FIG. 4, the light emitting unit 20 and the light guide 19 may be positioned such that the optical axis 24 of the light emitting unit 20 forms a predetermined angle θ with the axis 25 of the straight section 21c. That is, the axis 25 of the straight section 21c may be inclined at an angle θ with respect to the optical axis 24 of the light guide 19. The inclination angle θ may be between 5 to 20 degrees. In the embodiment described above, the light from the light emitting unit 20 enters the straight section 21c of the first body section 21 along a straight line. In contrast, in this modification, the light from the light emitting unit 20 enters the straight section 21c of the first body section 21 obliquely. Accordingly, the light entering the straight section 21c is more likely to be directed toward the second body section 22 after being reflected within the straight section 21c. As a result, a sufficient amount of light is provided to enable the second body section 22 to function as a side-marker lamp.

Figure 5:
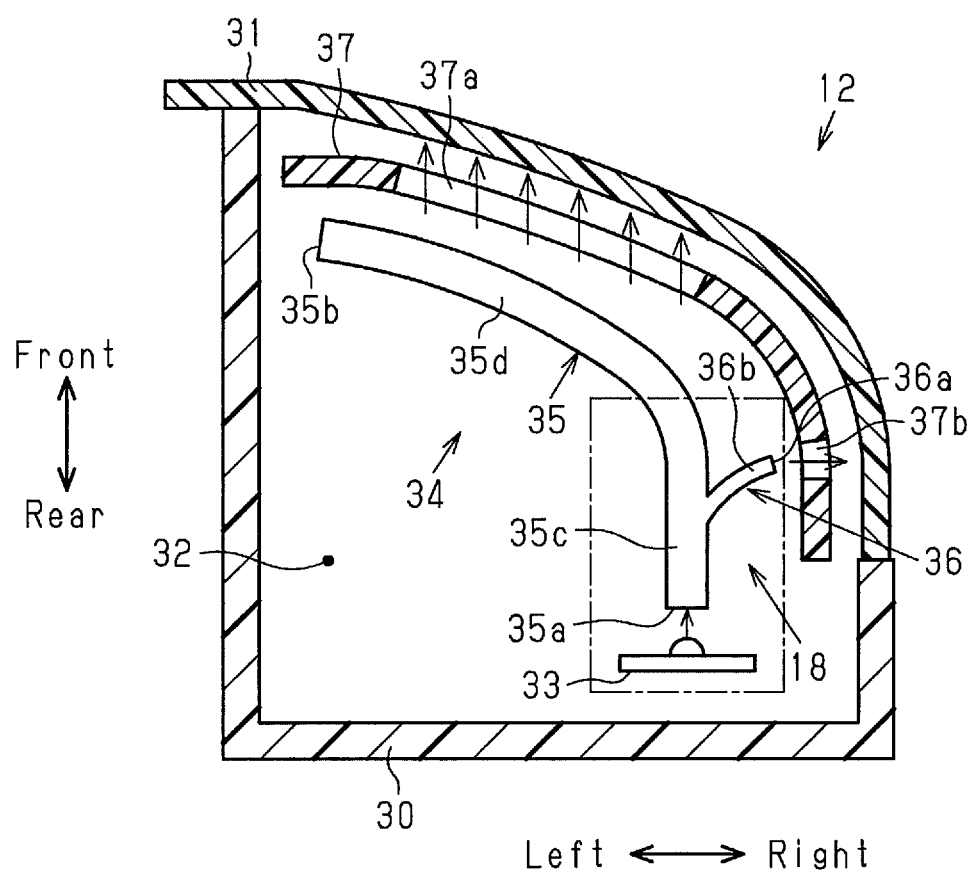
FIG. 5 is a cross-sectional view showing a headlamp that is an example of the vehicle lighting devices in FIG. 1.

As shown in FIG. 5, the structure that guides light in a plurality of directions using the light guide 19 is also applicable to a headlamp 12. FIG. 5 shows a headlamp 12 mounted on the right front side of the vehicle 10. The headlamp 12 mounted on the left front side of the vehicle 10 has the same structure and function. The headlamp 12 includes a housing 30 and an outer lens 31, which define a light chamber 32. The light chamber 32 houses a light emitting unit 33 and a light guide 34, which have the same structures as those of the embodiment described above. Specifically, the light guide 34 includes a first body section 35 and a second body section 36, which branches off from a middle part of the first body section 35. The first body section 35 includes a first end 35a, a second end 35b, a straight section 35c, which extends from the first end 35a, and a curved section 35d, which curves and extends from the straight section 35c to the second end 35b. The second body section 36 includes a basal end, which connects to the straight section 35c of the first body section 35, a distal end 36a, and a branch section 36b, which extends from the basal end to the distal end 36a. The straight section 35c extends in the front-rear direction of the vehicle 10. The straight section 35c is located outward of the curved section 35d in the vehicle width direction. The curved section 35d extends inward in the vehicle width direction from the straight section 35c. In the light chamber 32, the second end 35b is located inward of the first end 35a in the vehicle width direction. The second body section 36 (the branch section 36b) extends rightward from the straight section 35c in the vehicle width direction. In the light chamber 32, the second body section 36 is located outward of the first body section 35 (the straight section 35c and the curved section 35d) in the vehicle width direction. The second body section 36 (the branch section 36b) curves such that the distal end 36a points to the right (outward in the vehicle width direction). In the same manner as the first body section 21 of the embodiment described above, the first body section 35 is thicker than the second body section 36. The overall shape of the first body section 35 curves more gently than that of the second body section 36.

The light guided to the curved section 35d of the headlamp 12 then passes through the first passage 37a of the partition wall 37 and reaches the outer lens 31. After passing through the outer lens 31, the light is emitted to the front of the vehicle 10. The light guided to the distal end 36a through the straight section 35c and the branch section 36b then passes through the second passage 37b of the partition wall 37 and reaches the outer lens 31. After passing through the outer lens 31, the light is emitted to a side of the vehicle 10. As such, the first body section 35 functions as a headlamp, and the second body section 36 functions as a side-marker lamp. This modification guides the light from the single light emitting unit 33 into two different directions through the curved section 35d and the second body section 36. This allows the light beams guided in different directions to be used for different purposes. The light guide 34 is bar-shaped and thus capable of guiding light to a wide area. This improves the light intensity distribution performance of the headlamp 12 as a vehicle lighting device.

The modification shown in FIG. 5 is also applicable to clearance lamps, daylight running lights, and daytime running lamps, for example. That is, in addition to functioning as a headlamp for emitting light to the front of the vehicle 10, the first body section 35 may also function as a clearance lamp, a daytime running light, or a daytime running lamp. The first body section 35 may function as both of a clearance lamp and a daytime running light, or as both of a clearance lamp and a daytime running lamp. Further, the second body section 36, which emits light to a side of the vehicle 10, may function as a side-marker lamp.

Each of the light guides 19 and 34 of the embodiment and the modification described above uses a single light emitting unit to emit light not only to the rear or front of the vehicle 10 but also to a side of the vehicle 10. The light emitted by the light guides 19 and 34 may also be used for purposes other than those described for the embodiment and the modification.

The shape of the light guide 19 or 34 may be modified. For example, the light guide 19 or 34 may be a bar with an oval cross-section. However, it is not desirable that the light guide 19 or 34 have a polygonal cross-section and corners.

The light guide 19 or 34 may have a plurality of branch sections extending from the first body section 21 or 35.

The larger the diameter of the light guide 19 or 34, the larger the area that guides light becomes. Thus, the difference in diameter between the first body section 21 or 35 and the second body section 22 or 36 of the light guide 19 or 34 may be set as appropriate by performing a simulation based on the amount of light that needs to be guided. For example, when the sections need to guide generally the same amount of light, they may be identical in diameter. Further, when the luminous intensity of the tail lamp or the clearance lamp should be higher than the luminous intensity of the side-marker lamp, the diameter of the section of the light guide that functions as the tail lamp or the clearance lamp may be increased.

The first body section 21 or 35 of the light guide 19 or 34 does not have to have a uniform diameter over its entire length. The diameter may be partially varied. For example, the straight section 21c or 35c may differ from the curved section 21d or 35d in diameter. Likewise, the second body section 22 or 36 of the light guide 19 or 34 does not have to have a uniform diameter over its entire length. The diameter may be partially varied.

The light source of the light emitting unit 20 or 33 may be a chip LED or a light bulb.

Light may be emitted from the branch section 22b or 36b of the second body section 22 or 36 in addition to from the distal end 22a or 36a. In this case, the opening of the second passage 23b may be enlarged according to the area to which light should be emitted. Further, the branch section 22b or 36b may be modified so as to extend longer in the front-rear direction.

The first and second body sections 21 and 22 do not have to be formed integrally, and the first and second body sections 35 and 36 do not have to be formed integrally. For example, the light guide 19 or 34 may be formed by coupling a plurality of components.

The two tail lamps 13 may be laterally asymmetric. The left tail lamp 13 may differ in function from the right tail lamp 13. For example, one of the left and right tail lamps 13 may function as a backup lamp, or one of the left and right tail lamps 13 may function as a fog lamp.

The invention claimed is:

1. A vehicle lighting device configured to be mounted on a rear section of a vehicle, the vehicle lighting device comprising:
    a bar-shaped light guide including a first body section and a second body section, wherein
        the first body section includes a first end, a second end, which is opposite to the first end, a straight section, which extends from the first end, and a curved section, which extends from the straight section to the second end, and
        the second body section branches off from the straight section and extends in a direction different from a direction in which the curved section extends; and
    a light emitter arranged to emit light toward the first end of the first body section, wherein
    the curved section is configured to guide light that enters the straight section to a rear side of the vehicle so as to function as a tail lamp of the vehicle, and
    the second body section is configured to guide light that is reflected within the straight section to a side of the vehicle so as to function as a side-marker lamp of the vehicle.

2. The vehicle lighting device according to claim 1, wherein the first body section has a larger cross-sectional area than the second body section.

3. The vehicle lighting device according to claim 1, wherein
    the second body section curves and extends in a direction different from the direction in which the curved section extends, and
    the entire first body section or the curved section of the first body section curves more gently than the second body section.

4. The vehicle lighting device according to claim 1, wherein the second body section, which extends from the first body section, has a distal end pointing to the side of the vehicle.

5. The vehicle lighting device according to claim 1, wherein the straight section has an axis that is inclined with respect to an optical axis of the light emitter.

6. The vehicle lighting device according to claim 1, further comprising a partition wall including two through-holes that open in different directions,
    wherein light that is guided to the curved section and light that is guided to the second body section are emitted in different directions through respective ones of the two through-holes.

7. A vehicle lighting device configured to be mounted on a front section of a vehicle, the vehicle lighting device comprising:
    a bar-shaped light guide including a first body section and a second body section, wherein
        the first body section includes a first end, a second end, which is opposite to the first end, a straight section, which extends from the first end, and a curved section, which extends from the straight section to the second end, and
        the second body section branches off from the straight section and extends in a direction different from a direction in which the curved section extends; and
    a light emitter arranged to emit light toward the first end of the first body section, wherein
    the curved section is configured to guide light that enters the straight section to a front side of the vehicle so as to function as a headlamp, a clearance lamp, a daytime running light, or a daytime running lamp, and
    the second body section is configured to guide light that is reflected within the straight section to a side of the vehicle so as to function as a side-marker lamp.

8. The vehicle lighting device according to claim 7, wherein the first body section has a larger cross-sectional area than the second body section.

9. The vehicle lighting device according to claim 7, wherein
    the second body section curves and extends in a direction different from the direction in which the curved section extends, and
    the entire first body section or the curved section of the first body section curves more gently than the second body section.

10. The vehicle lighting device according to claim 7, wherein the second body section, which extends from the first body section, has a distal end pointing to the side of the vehicle.

11. The vehicle lighting device according to claim 7, wherein the straight section has an axis that is inclined with respect to an optical axis of the light emitter.

12. The vehicle lighting device according to claim 7, further comprising a partition wall including two through-holes that open in different directions,
    wherein light that is guided to the curved section and light that is guided to the second body section are emitted in different directions through respective ones of the two through-holes.

13. A vehicle lighting device configured to be mounted on a vehicle, the vehicle lighting device comprising:
    a bar-shaped light guide including a first body section and a second body section, wherein
        the first body section includes a first end, a second end, which is opposite to the first end, a straight section, which extends from the first end, and a curved section, which extends from the straight section to the second end, and the second body section branches off from the straight section and extends in a direction different from a direction in which the curved section extends; and a light emitter arranged to emit light toward the first end of the first body section, wherein the curved section and the second body section are configured to emit light in different directions.

14. The vehicle lighting device according to claim 13, wherein the first body section has a larger cross-sectional area than the second body section.

15. The vehicle lighting device according to claim 13, wherein the second body section curves and extends in a direction different from the direction in which the curved section extends, and the entire first body section or the curved section of the first body section curves more gently than the second body section.

16. The vehicle lighting device according to claim 13, wherein the second body section, which extends from the first body section, has a distal end pointing to the side of the vehicle.

17. The vehicle lighting device according to claim 13, wherein the straight section has an axis that is inclined with respect to an optical axis of the light emitter.

18. The vehicle lighting device according to claim 13, further comprising a partition wall including two through-holes that open in different directions, wherein light that is guided to the curved section and light that is guided to the second body section are emitted in different directions through respective ones of the two through-holes.

* * * * *